UNITED STATES PATENT OFFICE.

CHARLES EMILE HENRI LEROY AND FÉLIX MARIE JOSEPH ANTOINE CLAIREAUX, OF VERSAILLES, FRANCE.

PROCESS OF MANUFACTURE OF A PLASTIC PRODUCT.

1,394,746.   Specification of Letters Patent.   Patented Oct. 25, 1921.

No Drawing.   Application filed July 18, 1919.   Serial No. 311,750.

*To all whom it may concern:*

Be it known that we, CHARLES EMILE HENRI LEROY and FÉLIX MARIE JOSEPH ANTOINE CLAIREAUX, residing at Versailles, France, have invented new and useful Process of Manufacture of a Plastic Product, of which the following is a specification.

The invention has for its object the process of manufacture of a plastic product. This product is intended to be used for manufacturing toys, combs, buttons and the like.

To manufacture the said plastic product gelatin or glue is melted in a water-bath, and during the melting operation 10–25 per cent of glycerin are added according to the desired plasticity.

An equivalent result may be obtained when using; instead of glycerin, glucose, levulose, sugar, or saccharin.

The material melted is cast in suitable mold frames so as to form blocks or plates. Each block is cut in several pieces to make the drying operation easier. The material is then put in a closed vessel or in an evaporator in contact with air blown by a fan and preferably warmed.

When the blocks are dry enough they are divided in plates by ordinary cutting means. The plates are entirely dried either in open air or in a blast, and then they are dipped in pure formol to be stabilized. The duration of this immersion varies according to the thickness of plates. When the plates are removed from the bath, they are dried up to complete siccity. This material can be sawed, turned, molded, stamped and worked as horn or tortoise-shell. Besides it can be welded with itself.

In order that this material could be worked, it is warmed either by immersion in a bath of warm water or by means of a source of heat. It is important that heating be absolutely uniform.

The product can be colored by anilin or mineral coloring products.

In that case, the coloring products are introduced in suitable proportion according to the color wanted during fusion of gelatin or glue.

Having now particularly described and ascertained the nature of our said invention and in what manner the same is to be performed, we declare that what we claim is:

1. A process of manufacturing a plastic product comprising: melting gelatin or glue, mixing it during fusion, with glycerin or complementary product, casting the mass in plates or blocks which are cut in small pieces, drying these pieces, transforming the mass in plates, dipping it in formol and drying it thoroughly.

2. In a process conforming with claim 1 the addition of anilin or mineral coloring products to gelatin during the melting operation.

In testimony whereof we affix our signatures.

CHARLES EMILE HENRI LEROY.
FÉLIX MARIE JOSEPH ANTOINE CLAIREAUX.